US009957376B2

(12) United States Patent
Huang et al.

(10) Patent No.: US 9,957,376 B2
(45) Date of Patent: May 1, 2018

(54) OPTICAL MATERIAL COMPOSITION AND USE THEREOF

(71) Applicant: ETERNAL MATERIALS CO., LTD., Kaohsiung (TW)

(72) Inventors: Chi-Yu Huang, Kaohsiung (TW); Hsiunchia Shih, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days. days.

(21) Appl. No.: 15/086,743

(22) Filed: Mar. 31, 2016

(65) Prior Publication Data
US 2016/0312009 A1    Oct. 27, 2016

(30) Foreign Application Priority Data

Mar. 31, 2015    (TW) .............................. 104110633 A

(51) Int. Cl.
| | | |
|---|---|---|
| *C08F 2/46* | (2006.01) |
| *C08F 2/50* | (2006.01) |
| *C08G 61/04* | (2006.01) |
| *C08K 5/523* | (2006.01) |
| *C08F 222/20* | (2006.01) |
| *G02B 13/00* | (2006.01) |
| *G02B 1/04* | (2006.01) |
| *C08F 222/10* | (2006.01) |
| *C08L 33/08* | (2006.01) |
| *C08L 35/02* | (2006.01) |
| *C08K 3/32* | (2006.01) |
| *C08K 5/05* | (2006.01) |
| *C08K 5/37* | (2006.01) |

(52) U.S. Cl.
CPC ............ *C08K 5/523* (2013.01); *C08F 222/10* (2013.01); *C08F 222/20* (2013.01); *C08L 33/08* (2013.01); *C08L 35/02* (2013.01); *G02B 1/04* (2013.01); *G02B 1/041* (2013.01); *G02B 1/043* (2013.01); *G02B 13/0085* (2013.01); *C08K 3/32* (2013.01); *C08K 5/05* (2013.01); *C08K 5/37* (2013.01); *C08K 2003/329* (2013.01)

(58) Field of Classification Search
CPC .... C08K 5/523; C08K 2003/329; C08K 3/32; C08F 333/20; C08F 222/1006; C08F 222/10; C08F 2220/1875; C08F 2222/1013; C08F 2222/006; G02B 1/041; G02B 1/04; G02B 1/043; G02B 13/0085; C08L 33/08; C08L 35/02
USPC ........... 522/42, 33, 6, 71, 189, 184, 1; 520/1
See application file for complete search history.

(56) References Cited

U.S. PATENT DOCUMENTS

| | | | | |
|---|---|---|---|---|
| 2008/0233310 A1* | 9/2008 | Fujita | .................... | B29C 43/222 428/1.6 |
| 2009/0185363 A1* | 7/2009 | Ishikawa | ................. | C08L 69/00 362/97.1 |
| 2011/0092612 A1* | 4/2011 | Miki | .................... | C07D 307/91 522/154 |
| 2016/0369029 A1* | 12/2016 | Ohmori | ............... | C08F 290/068 |

FOREIGN PATENT DOCUMENTS

| | | | |
|---|---|---|---|
| JP | 2011-202106 | * | 10/2011 |
| TW | 201132657 A1 | | 10/2011 |
| TW | 201211078 A | | 3/2012 |
| TW | 201238977 A | | 10/2012 |
| WO | 2011-074666 | * | 6/2011 |

OTHER PUBLICATIONS

Sanai, WO 2011-074666 Machine Translation, Jun. 23, 2011.*
Sakai, JP 2011-202106 Machine Translation, Oct. 13, 2011.*
Search Report in TW Application No. 104110633 dated Aug. 12, 2015.

* cited by examiner

*Primary Examiner* — Jessica Whiteley
(74) *Attorney, Agent, or Firm* — Shimokaji IP

(57) ABSTRACT

The present invention provides an optical material composition, including: (a) an acrylate-based material; (b) an anti-yellowing agent, selected from the group consisting of an inorganic phosphorus-containing acid, a phosphate and a combination thereof; and (c) an initiator. After being cured, the composition of the present invention has good transmittance, anti-yellowing performance and high-temperature resistance.

7 Claims, No Drawings

OPTICAL MATERIAL COMPOSITION AND USE THEREOF

BACKGROUND OF THE INVENTION

1. Field of the Invention

The present invention relates to an optical material composition, and in particular, to an anti-yellowing optical material composition with high temperature resistance.

2. Description of the Related Art

The trends toward microminiaturization and price reduction of mobile phone camera modules have fostered keen interest in wafer level camera (WLC) technology. Employing wafer level manufacturing technology allows reduction of camera module size from a traditional height of 3 to 5 mm to a height of only 2 to 2.5 mm. If the material has high temperature resistance, it can also generate a 30% to 50% reduction in manufacturing costs.

In wafer level camera technology, optical components are manufactured in a wafer level. A reflowable material is used as a lens, and technologies related to semiconductor manufacturing and optical image sensor components are employed to prepare a wafer level lens. A wafer level lens module is prepared by forming thousands of lenses on a wafer using the semiconductor technology, grouping the lenses using the wafer level packaging technology, and cutting into independent lens cubes. The wafer level camera technology not only can minimize the number of required components, simplify the manufacturing process, and be applied to mass production, but can also reduce production costs.

Because the wafer level camera module is installed by using a reflow soldering method, the lens material used must have properties similar to glass materials, i.e. high temperature resistance and reflowability. At present, the plastic lenses used in mobile phone camera modules are mostly produced by using a plastic injection method and have relatively low heat resistance; such plastic lenses are not applicable to manufacturing processes for a wafer level camera module. Therefore, improved heat resistance of the lens material is an important concern for a wafer level camera module.

In addition, according to previous literature (such as TW201211078 (A)), it is known that yellowing may occur in a thermoplastic resin due to high temperature during thermoforming or after prolonged use. Because yellowing may affect availability and reliability of an optical component (such as a lens), there is a need to overcome the problem of yellowing of optical materials.

With respect to yellowing inhibition, a currently known method is adding an anti-oxidant. Such anti-oxidant includes the following two types: a free radical scavenger that traps a generated free radical and makes the free radical ineffective, and a peroxide decomposer that decomposes a generated peroxide into inert substances to inhibit generation of a new free radical. The free radical scavenger is mainly a hindered phenol compound and a hindered amine compound, and the peroxide decomposer is mainly a phosphorus compound.

However, according to TW 201211078 (A), the phosphorus compound has a low yellowing inhibition effect, and under processing conditions (such as reflow soldering) at a high temperature (such as about 260° C.), it is difficult to sufficiently inhibit yellowing. The yellowing inhibition effect is especially insufficient when the phosphorus compound is applied to an optical component (such as a lens) material, and therefore such compound is not applicable as lens material of a wafer level camera module.

According to TW 201238977 (A), if only a phenol anti-oxidant is used, the long-term anti-oxidant effect is not sufficient. Using a phenol anti-oxidant and a phosphorus anti-oxidant in combination can improve persistence of the anti-oxidant effect. However, such anti-oxidants have an insufficient anti-oxidant effect under processing conditions (such as reflow soldering) at a high temperature (such as about 260° C.). When they are applied to an optical component (such as a lens) material, the yellowing inhibition effect thereof is absolutely insufficient, and they are also not applicable as lens material of a wafer level camera module.

On the other hand, when an amount of added free radical scavenger is sufficient to inhibit yellowing, the inhibition effect of free radical polymerization generated by the free radical scavenger may adversely limit hardening of the composition, thereby reducing the toughness of a hardened product. The reason is that molecular chain scission in a polymeric material at a high temperature may generate free radicals, and these free radicals may react with other surrounding molecular chains and cause further molecular chain scission, thereby generating new free radicals. Continuous reactions result in the molecular chain of the polymeric material being shortened, mechanical performance thereof being reduced, and the material having a change of color or turning yellow.

In view of these concerns, the present invention provides an anti-yellowing optical material composition with high temperature resistance, which effectively solves the problems existing in the art.

SUMMARY OF THE INVENTION

An objective of the present invention is to provide an optical material composition, including: (a) an acrylate-based material; (b) an anti-yellowing agent; and (c) an initiator, where the anti-yellowing agent is selected from the group consisting of an inorganic phosphorus-containing acid, a phosphate and a combination thereof.

The composition of the present invention is applicable to a manufacturing process of a wafer level camera lens or a wafer level packaging process. The composition has optical properties similar to glass materials, high-temperature resistance and reflowability, and also has a sufficient anti-yellowing effect, thereby facilitating SMT (Surface Mounted Technology) automated assembly and parts management at a system company.

PREFERRED EMBODIMENT OF THE PRESENT INVENTION

To facilitate understanding of the disclosed content herein, several terms are defined below.

The term "about" refers to an acceptable error for a specific value measured by a person of ordinary skill in the art, which is determined partially according to how the value is measured or determined.

The present invention provides an optical material composition, including: (a) an acrylate-based material; (b) an anti-yellowing agent, selected from the group consisting of an inorganic phosphorus-containing acid, a phosphate and a combination thereof; and (c) an initiator. The optical material composition is applicable to a lens material of a wafer level camera module, and has high-temperature resistance and reflowability, so that the module can be installed by using a reflow soldering method, thereby simplifying assembly engineering.

After being cured, the optical material composition of the present invention has a transmittance of greater than 90%, preferably greater than 93%.

The composition of the present invention is applicable to a manufacturing process of a wafer level camera lens or a wafer level packaging process. For example, the curable optical material composition of the present invention may be injected into a substrate and form a lens after curing. The optical material composition of the present invention preferably has a viscosity of about 20 cps to about 1,700 cps, where the viscosity may include any value within the range. According to an embodiment of the present invention, the viscosity of the optical material composition may be 25 cps, 50 cps, 100 cps, 500 cps, 1,000 cps, 1,500 cps or 1,600 cps. Generally, if the viscosity is excessively low (such as less than 20 cps), excessive glue may be a problem; but if the viscosity is excessively high (such as greater than 1,700 cps), it may lead to disadvantageous generation of bubbles.

According to an embodiment of the present invention, the acrylate-based material in the optical material composition of the present invention includes an acrylate-based monomer used as a main component. In this embodiment, there is no special limit to the amount of the acrylate-based monomer, which may preferably reach 100% of the total weight of the acrylate-based material. According to another embodiment of the present invention, the acrylate-based material in the optical material composition of the present invention includes an acrylate-based monomer and an acrylate-based oligomer. In this embodiment, the amount of the acrylate-based monomer is preferably about 50% to about 99.9%, more preferably about 55% to about 95%, of the total weight of the acrylate-based material. The amount of the acrylate-based oligomer is preferably about 0.1% to about 50%, more preferably about 5% to about 45%, of the total weight of the acrylate-based material.

The acrylate-based monomer may be a mono-functional or multi-functional acrylate-based monomer. In the optical material composition of the present invention, the mono-functional or multi-functional acrylate-based monomer has an effect of adjusting the viscosity of the composition. The multi-functional acrylate-based monomer can further provide a high-density bridging action so that a highly cross-linked optical material can be formed after curing.

In the optical material composition of the present invention, the mono-functional acrylate-based monomer includes an acrylate-based monomer having one polymerizable unsaturated group, preferably an acrylate-based monomer having one ethylenically unsaturated group, more preferably an acrylate-based monomer having one acrylate group. The multi-functional acrylate-based monomer is an acrylate-based monomer having at least two polymerizable unsaturated groups, preferably an acrylate-based monomer having at least two ethylenically unsaturated groups, for example, but not limited to, an acrylate-based monomer having three or more acrylate groups.

Generally, for the convenience of operation, an optical material for injection-molding is not cross-linked or has a relatively low cross-linking degree. Therefore, high temperature resistance and deformation resistance thereof are generally poor. In an embodiment of the present invention, to avoid insufficient cross-linking, the amount of the multi-functional acrylate-based monomer is at least about 5% of the total weight of the acrylate-based monomer, which can further provide a bridging function and reduce occurrence of precipitation. The amount of the multi-functional acrylate-based monomer is preferably about 10% to about 99.6%, more preferably about 15% to about 99.5%, of the total weight of the acrylate-based monomer. Increasing the degree of cross-linking can further improve heat resistance and mechanical performance (such as higher hardness and chemical resistance), so the optical material composition can be applied to a reflow soldering process carried out at a high temperature, such as 180° C. or above, and more applicable to a reflow soldering process carried out at a high temperature of 260° C. or above or even 300° C. or above.

The species of the acrylate-based monomer include, for example, but are not limited to, (meth)acrylic monomers, (meth)acrylate monomers or a mixture thereof, preferably (meth)acrylate monomers.

The mono-functional (meth)acrylate monomer suitable for the present invention may be selected from, for example, but not limited to, the group consisting of methyl methacrylate (MMA), butyl methacrylate, 2-phenoxy ethyl acrylate, ethoxylated 2-phenoxy ethyl acrylate, 2-(2-ethoxyethoxy) ethyl acrylate, cyclic trimethylolpropane formal acrylate, β-carboxyethyl acrylate, lauryl methacrylate, isooctyl acrylate, stearyl methacrylate, isodecyl acrylate, isobornyl (meth)acrylate, benzyl acrylate, 2-hydroxyethyl methacrylate phosphate, hydroxyethyl acrylate (HEA), 2-hydroxyethyl methacrylate (HEMA) and a combination thereof.

The multi-functional (meth)acrylate monomer suitable for the present invention may be selected from, for example, but not limited to, the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl) isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl) isocyanurate, trimethylolpropane triacrylate and a combination thereof.

According to an embodiment of the present invention, the preferable mono-functional or multi-functional acrylate-based monomers include, for example, 2-phenoxy ethyl acrylate, lauryl methacrylate, isodecyl acrylate, isobornyl (meth)acrylate, trimethylolpropane tri(meth)acrylate, pentaerythritol triacrylate, pentaerythritol tetraacrylate, ethoxylated trimethylol propane trimethacrylate or propoxylated glycerol trimethacrylate.

The commercial mono-functional or multi-functional acrylate-based monomers suitable for the present invention include: products manufactured by Eternal Materials Co. Ltd. with the name of EM2204, EM223, EM229, EM328 EM2308, EM231, EM219, EM90, EM70, EM235, EM2381, EM2382, EM2383, EM2384, EM2385, EM2386, EM2387, EM331, EM3380, EM241, EM2411, EM242, EM2421, EM264 or EM265

The acrylate-based oligomer may be a mono-functional or multi-functional acrylate-based oligomer, preferably a multi-functional (meth)acrylate-based oligomer.

According to an embodiment of the present invention, the mono-functional or multi-functional acrylate-based oligomer includes, but is not limited to: urethane (meth)acrylate, such as aliphatic urethane (meth)acrylate, aromatic urethane (meth)acrylate, aliphatic urethane di(meth)acrylate, aromatic urethane di(meth)acrylate, siliconized urethane (meth)acrylate, aliphatic urethane hexa(meth)acrylate, or aromatic urethane hexa(meth)acrylate; epoxy (meth)acrylate, such as bisphenol-A epoxy di(meth)acrylate or novolac epoxy (meth)acrylate; (polyester (meth)acrylate), such as polyester di(meth)acrylate; (meth)acrylate oligomer; polyether (meth)acrylate oligomer; or a combination thereof. According to a preferred embodiment of the present invention, the acrylate-based material is preferably urethane (meth)acrylate.

The commercial acrylate-based oligomers suitable for the present invention include: products manufactured by Eternal Materials Co. Ltd. under the name of 6101-100, 611A-85, 6112-100, 6113, 6114, 6123, 6131, 6144-100, 6145-100, 6150-100, 6160B-70, 621A-80, 621-100, EX-06, 6315, 6320, 6323-100, 6325-100, 6327-100, 6336-100 or 6361-100; products manufactured by Sartomer company under the name of CN9001, CN9002 CN9004, CN9006, CN9014, CN9021, CN963J75, CN966J75, CN973J75, CN962, CN964, CN965, CN940, CN945 or CN990.

The amount of the acrylate-based oligomer is about 0% to about 50% of the total weight of the acrylate-based material. The acrylate-based oligomer may be used to adjust the viscosity of the composition, and reduce the shrinkage of the composition after curing. In an embodiment of the present invention, when the amount of the acrylate-based oligomer is excessively high (such as higher than 45 wt %, or even higher than 50 wt %), it may easily result in insufficient heat resistance after the composition is cured, and therefore, the composition is difficult to apply to a reflow soldering process at a high temperature of 180° C. or above. In another embodiment of the present invention, the acrylate-based material may not include the acrylate-based oligomer.

Optionally, the acrylate-based material may further include a resin. The resin may be used to adjust the viscosity of the composition and increase the toughness of the material after curing. There is no special limit to the species of the resin. The resin can be those well known to a person of ordinary skill in the art, for example, but is not limited to: a polyester resin, a polyacrylate resin, a polyolefin resin, a polycycloolefin resin, a polyamide resin, a polyimide resin, a polycarbonate resin, a polyurethane resin or a combination thereof. According to a preferred embodiment of the present invention, the resin may be a polyester resin or a polyacrylate resin. The amount of the resin is about 0% to about 30%, preferably about 0.1% to about 20%, of the total weight of the acrylate-based material. If the amount exceeds 30%, the cured composition may have a problem of insufficient temperature tolerance.

In the optical material composition of the present invention, the amount of the acrylate-based material is about 70% to about 99.9%, preferably about 75% to about 99.7%, more preferably about 80% to about 99.5%, of the total weight of the composition.

Generally, yellowing resistance of an optical material composition is poor, and is especially serious at high temperature. Therefore, to avoid yellowing, an ultraviolet light absorber or inorganic particulates having an ultraviolet light absorbing capacity or a combination thereof may be added to the optical material composition. However, the ultraviolet light absorber absorbs ultraviolet light, thereby diminishing ultraviolet light transmittance and resulting in incomplete reaction. Adding inorganic particulates may result in the transparency of the cured composition not meeting the requirements. It is known in the art that traditional phosphorus compounds have a low yellowing inhibition effect and such yellowing inhibition effect is absolutely insufficient. However, The inventor of the present application found through extensive research that when an anti-yellowing agent selected from an inorganic phosphorus-containing acid, a phosphate and a combination thereof is added to an acrylate-based material (especially the acrylate-based material of the present invention), color change of the optical material at high temperature can be inhibited. The inorganic phosphorus-containing acid includes an inorganic phosphorous acid and a salt derived therefrom. For example, the anti-yellowing agent may be phosphoric acid, phosphate salt, phosphorous acid, hypophosphorous acid, hypophosphite salt, alkyl phosphate, aromatic phosphate or a combination thereof. According to a preferred embodiment of the present invention, the anti-yellowing agent is hypophosphorous acid, sodium hypophosphite, triphenyl phosphate (TPP), tricresyl phosphate (TCP), tri(isopropylphenyl) phosphate, cresyl diphenyl phosphate, tetraphenyl resorcinol diphosphate or a mixture thereof.

In the optical material composition of the present invention, the amount of the anti-yellowing agent may be adjusted according to the species and amount of the acrylate-based material and initiator included in the optical composition. According to an embodiment of the present invention, the amount of the anti-yellowing agent is about 0.01% to about 6%, preferably about 0.03% to about 5%, more preferably about 0.05% to about 4%, of the total weight of the composition. According to an embodiment of the present invention, the amount of the anti-yellowing agent is 0.1%, 0.4%, 0.6%, or 1% of the total weight of the composition. Generally, if the amount of the anti-yellowing agent is excessively low (such as less than 0.01%), it may lead to poor anti-yellowing performance; if the amount thereof is excessively high (such as greater than 6%), it may generate disadvantages in that the composition has poor uniformity and is easily precipitated.

There is no special limit to the species of the initiator used in the optical composition of the present invention, which can rapidly generate a free radical after being provided with heat energy or energy rays (such as UV light), and use the free radical to induce polymerization. The initiator of the present invention is a thermal initiator, a photoinitiator, or a mixture thereof. The energy rays refer to an optical source within a certain wavelength range, such as ultraviolet light, infrared light, visible light or high-energy rays (electron beams), preferably ultraviolet light. The illumination intensity may be 500 mJ/cm$^2$ to 5,000 mJ/cm$^2$, preferably 2,000 mJ/cm$^2$ to 4,000 mJ/cm$^2$.

The thermal initiator is preferably selected to be an organic peroxide having a half-life period of 5 hours to 15 hours at a temperature of 40° C. to 100° C. Within this range, the optical composition of the present invention is stored at room temperature without difficulty, and can be rapidly cured. In the optical material composition of the present invention, the thermal initiator may be selected from, but is not limited to, the group consisting of one or more of benzoyl peroxide, cumyl hydroperoxide, dicumyl peroxide, dibenzoyl peroxide, tert-butyl hydroperoxide, tert-butyl monoperoxymaleate, acetyl peroxide, and dilauroyl peroxide, a mixture of one or more of the foregoing peroxides and amino acid or sulfonic acid, a mixture of one or more of the foregoing peroxides and a cobalt-containing compound, and azodiisobutyronitrile (AIBN). According to a preferred embodiment of the present invention, the thermal initiator may be a peroxide selected from the group of consisting of tert-butyl hydroperoxide, dibenzoyl peroxide, tert-butyl monoperoxymaleate, acetyl peroxide, dilauroyl peroxide and a mixture thereof.

In the optical material composition of the present invention, the photoinitiator is selected from, but not limited to, the group consisting of acetophenone, benzoin, benzophenone, thioxanthone and anthraquinone initiators, and a mixture thereof. According to an embodiment of the present invention, the photoinitiator is selected from the group consisting of benzophenone, 1-hydroxycyclohexyl phenyl ketone or 2,4,6-trimethyl benzoyl diphenyl phosphine oxide, and a mixture thereof.

The amount of the initiator may be adjusted according to the species and amount of the free radical polymerizable compound included in the optical composition. An excessively large amount initiator may cause the optical composition of the present invention to have poor stability and be easily degenerated during storage or transportation; or may result in an excessive amount of initiator left after reaction, thereby affecting the anti-yellowing capacity of the material. An excessively small amount of the initiator may cause the optical composition of the present invention to be incompletely cured. Generally, the amount of the initiator is about 0.01% to about 10%, preferably about 0.03% to about 6%, most preferably about 0.05% to about 3%, of the total weight of the composition.

To meet the requirements of high-end optical material applications, it is desired to provide an optical component having a lower chromaticity and a lower yellowing value. In the optical material composition of the present invention, (d) an anti-yellowing aid may be further added. The anti-yellowing aid is selected from a thiol compound or a phenol compound. Adding the thiol compound can promote the reaction of double bonds in the free radical polymerizable compound so as to reduce the content of unreacted double bonds in the optical material composition. Hence, the impact of residual double bonds on yellowing of the resin at high temperature can be reduced. The phenol compound can reduce the residual free radicals in the resin, and also has an anti-yellowing effect at high temperature.

The phenol compound includes, but is not limited to an anti-reductive phenol compound or an anti-oxidative phenol compound, preferably an anti-oxidative phenol compound. The anti-oxidative phenol compound includes, but is not limited to: 2,6-Di-tert-butyl-4-methylphenol, octadecyl 3-(3,5-di-tert-butyl-4-hydroxyphenyl)propionate, pentaerythritol tetrakis(3-(3,5-di-tert-butyl-4-hydroxy-phenyl)propionate), triethylene glycol bis β-(3-tert-butyl-4-hydroxy-5-methylphenyl) propionate, 1,3,5-trimethyl-2,4,6-tris(3,5-di-tert-butyl-4-hydroxybenzyl)benzene, tris(3,5-di-tert-butyl-4-hydroxybenzyl) isocyanurate, 3,9-Bis [1,1-dimethyl-2-[(3-tert-butyl-4-hydroxy-5 -Methylphenyl)propionyloxy]ethyl]-2,4,8,10-tetraoxaspiro[5.5]undecane, 2,2'-Methylenebis(6-tert-butyl-4-methylphenol, 4,4'-Butylidenebis(6-tert-butyl-3-methylphenol), 4,4'-thio-bis(6-t-butyl-3-methyl phenol), etc.

The commercial anti-oxidative phenol compound includes: IRGANOX 1010, IRGANOX 1035, IRGANOX 1076, IRGANOX 1135, IRGANOX 245, IRGANOX 259 or IRGANOX 295 made by Ciba Japan; Adekastab AO-30, Adekastab AO-40, Adekastab AO-50, Adekastab AO-60, Adekastab AO-70, Adekastab AO-80, Adekastab AO-90 or Adekastab AO-330 made by ADEKA company; Sumilizer GA-80, Sumilizer MDP-S, Sumilizer BBM-S, Sumilizer GM, Sumilizer GS(F) or Sumilizer GP made by Sumitomo Chemical company; HOSTANOX O10, HOSTANOX O16, HOSTANOX O14 or HOSTANOX O3 made by Clariant company; ANTAGE BHT, ANTAGE W-300, ANTAGE W-400 or ANTAGE W500 made by Kawaguchi Chemical Industry Co., LTD; and SEENOX 224M or SEENOX 326M made by SHIPRO KASEI KAISHA LTD.

In the optical material composition of the present invention, the thiol compound is preferably a polythiol, and according to an embodiment of the present invention, is more preferably a polythiol containing three or more sulfur atoms.

According to an embodiment of the present invention, the thiol compound is a polythiol compound of the following formula (I):

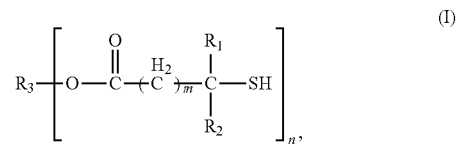

wherein $R_1$ and $R_2$ are each independently H, or a straight-chain or branched $C_1$-$C_4$ alkyl; and $R_3$ is an n-valence organic group, where n is an integer from 2 to 6, and m is an integer from 0 to 3.

In the polythiol compound of the formula (I), preferably, $R_1$ and $R_2$ are each independently H or methyl, and m is 0 or 1.

According to a preferred embodiment of the present invention, the formula (I) may be the following formulae:

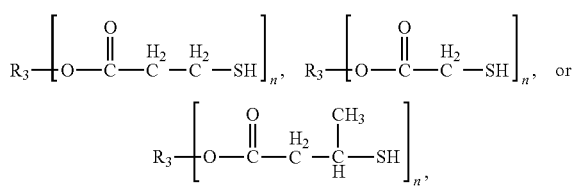

where n is defined as above.

According to a preferred embodiment of the present invention, the polythiol compound is:

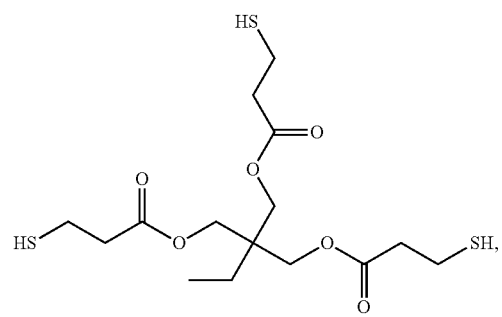

-continued

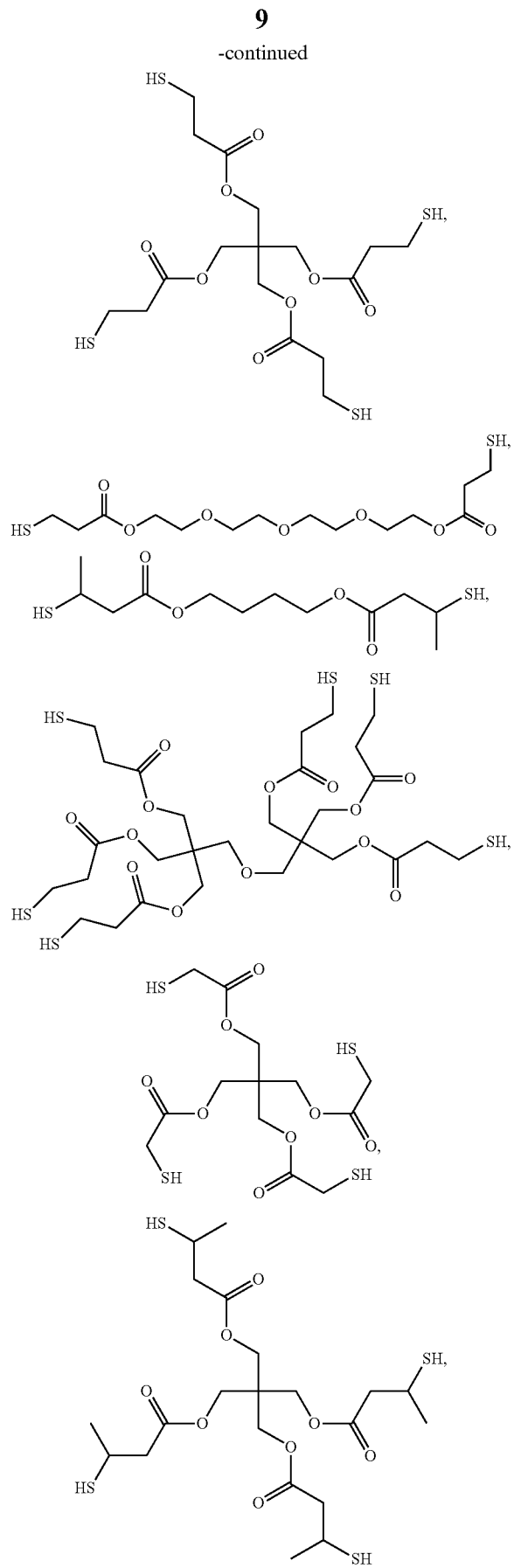

-continued

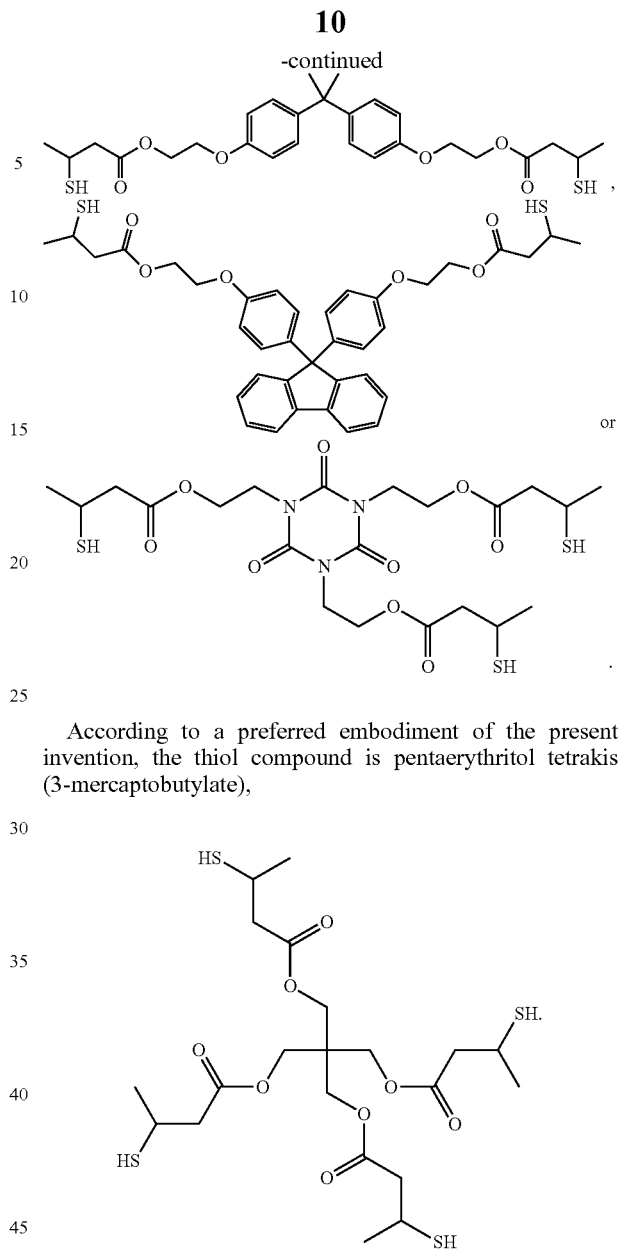

According to a preferred embodiment of the present invention, the thiol compound is pentaerythritol tetrakis (3-mercaptobutylate), If only (d) an anti-yellowing aid is added in the optical material composition of the present invention but (b) the anti-yellowing agent is not used, the anti-yellowing effect at high temperature cannot be achieved. The amount of the anti-yellowing aid should not be excessively high. According to a preferred embodiment of the present invention, the amount of the anti-yellowing aid is about 0% to about 8%, preferably about 0.005% to about 6%, more preferably about 0.007% to about 5%, most preferably about 0.01% to about 4%, of the total weight of the composition. According to an embodiment of the present invention, the amount of the anti-yellowing aid is 0.1%, 0.2%, 0.4%, or 1% of the total weight of the composition. According to another embodiment of the present invention, the anti-yellowing aid may generate a synergistic effect with the anti-yellowing agent, and has a better yellowing inhibition effect. In addition, by means of adding a small amount of the anti-yellowing aid, an anti-yellowing effect equivalent to a composition containing a relatively large quantity of the anti-yellowing agent may be provided. Therefore, by adding a small amount of the anti-yellowing aid, the desirable anti-yellowing effect may still be achieved even when the content of the anti-yellowing agent in the composition is reduced. When the anti-yellowing aid comprises a combination of several species, it has a better yellowing inhibition effect.

The composition of the present invention may include an additive known by a person skilled in the art, including but being not limited to a co-initiator, a sensitizer, a conductive particle type agent, a coupling agent, a dispersing agent, a wetting agent, a thickening agent, an anti-foaming agent or a thixotropic agent, or the like.

The optical material composition of the present invention can be cured to form a product having high transmittance (greater than about 90%, more preferably greater than about 93%) and high-temperature resistance and reflowability that similar to glass material, as well as the advantage that yellowing hardly occurs. Therefore, the composition may be applied to a common lens, a wafer level camera lens, or wafer level packaging, and is especially applicable as a lens material in a process of manufacturing a wafer level camera.

For the foregoing wafer level camera, production, calibration and welding of key components (a lens and an image sensor) required for an existing camera module all use a semi-conductor manufacturing process, and therefore, high integration can be achieved with the following advantages:

(1) Small volume: Chip-size packaging is used. The size and thickness of the product can be further minimized after the removal of the plastic dies, flex-lead cables, etc.

(2) Reflowability: A plastic lens having low heat resistance is used in existing mobile phone camera modules, in which case reflow soldering methods cannot be used. The camera module can be installed onto a main circuit board only by using a circuit board. A lens with relatively high heat resistance is used in a wafer level camera module, so the module can be installed by using the reflow soldering method, thereby simplifying assembly engineering.

(3) Shortened manufacturing process and low costs: the wafer level packaging does not need an intermediate layer, a filler and a lead frame, and processes such as die bonding, wire bonding, and manual focusing can be omitted. Therefore, material and labor costs can be significantly reduced, and the production cost of a camera module manufacturer can be reduced by 30% or more. In addition, the wafer level manufacturing process can be implemented at mass production scale to produce the lens and complete the assembly of camera at one time. Due to standardization and mass production, the objective of reducing costs can be achieved.

The manufacturing method of the optical material composition of the present invention includes mixing an acrylate-based material, an anti-yellowing agent, an initiator and optional component(s). A person of ordinary skill in the art can clearly understand and implement the manufacturing method with reference to the content disclosed in the specification of the present application and the accompanying embodiments.

The present invention further provides a wafer level camera lens, which is formed of the foregoing optical material composition.

The present invention further provides a method for manufacturing a wafer level camera, where the method includes: injecting the foregoing optical material composition to a wafer, and curing the composition so as to form a wafer level camera lens.

The following embodiments are only used for further describing the present invention, rather than limiting the scope of the present invention. Any modifications and variations that can be easily made by a person skilled in the art shall fall within the scope of the disclosure of this specification and the scope of the appended claims.

EXAMPLES

High-Temperature Resistance and Anti-Yellowing Test

An optical material composition of Examples 1 to 6 and Comparative Example 1 was prepared according to proportions (gram) disclosed in Table 1. The composition was stirred and mixed evenly, and then injected into a space between two pieces of glass (15 cm×15 cm×0.3 cm), to form a resin sheet with a diameter of about 6 cm to 8 cm and a thickness of 0.1 cm. The resin sheet was subjected to 1,800 mJ/cm² UV exposure (high-pressure mercury lamp), for curing, and then removed. A high temperature test was performed under condition A (temperature: 300° C.; time: 20 min) or condition B (temperature: 260° C.; time: 30 min) A colorimeter (NE4000; NIPPON DENSHOKU) was used to measure the chromaticity before and after the high temperature test, so as to obtain a chromaticity change value (Δb), that is, a value of b measured after the high temperature test minus a value of b measured before the high temperature test. The chromaticity change values (Δb) obtained in the examples and comparative example are shown in Table 2 to Table 4.

TABLE 1

| Component\Example | a | b | c | d | e | f | g | h |
|---|---|---|---|---|---|---|---|---|
| 1a | 35 | 15 | 0.2 | 0.05 | | | | |
| 1b | 35 | 15 | 0.2 | 0.2 | | | | |
| 1c | 35 | 15 | 0.2 | 0.3 | | | | |
| 1d | 35 | 15 | 0.2 | 0.5 | | | | |
| 2a | 35 | 15 | 0.2 | | 0.05 | | | |
| 2b | 35 | 15 | 0.2 | | 0.2 | | | |
| 2c | 35 | 15 | 0.2 | | 0.3 | | | |
| 2d | 35 | 15 | 0.2 | | 0.5 | | | |
| 3a | 35 | 15 | 0.2 | | | 0.05 | | |
| 3b | 35 | 15 | 0.2 | | | 0.2 | | |
| 3c | 35 | 15 | 0.2 | | | 0.3 | | |
| 3d | 35 | 15 | 0.2 | | | 0.5 | | |
| 3e | 35 | 15 | 0.2 | | | 2.5 | | |
| 4 | 35 | 15 | 0.2 | | 0.05 | | 0.1 | |
| 5 | 35 | 15 | 0.2 | | 0.05 | | 0.1 | 0.1 |
| 6 | 35 | 15 | 0.2 | | 0.05 | 0.1 | 0.1 | 0.1 |
| (Comparative Example 1) | 35 | 15 | 0.2 | | | | | | a: dipentaerythritol hexaacrylate (EM264 provided by Eternal Materials Co., Ltd.)
b: tricyclodecane dimethanol diacrylate (EM2204 provided by Eternal Materials Co., Ltd.)
c: 1-hydroxy cyclohexyl phenyl ketone (Irgacure 184 provided by BASF)
d: sodium hypophosphite
e: phosphinic acid/hypophosphorous acid (HA3, 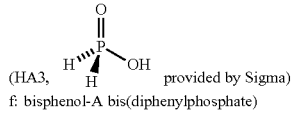 provided by Sigma)

f: bisphenol-A bis(diphenylphosphate)

(AD191, provided by ChangChun Company)
g: pentaerythritol tetrakis

TABLE 1-continued

| Component\Example | a | b | c | d | e | f | g | h |
|---|---|---|---|---|---|---|---|---| g: pentaerythritol tetrakis (3-mercaptobutylate), structure shown
h: butylated hydroxytoluene (BHT, provided by Sigma), structure shown
i: isobornyl acrylate (EM70 provided by Eternal Materials Co., Ltd.)

TABLE 2

| | Example | | | | | | | |
|---|---|---|---|---|---|---|---|---|
| | 1a | 1b | 1c | 1d | 2a | 2b | 2c | 2d |
| Condition A | 2.25 | 2.22 | 2.05 | 1.91 | 2.32 | 2.22 | 0.93 | −2.11 |

| | Example | | | | | (Comparative Example 1) |
|---|---|---|---|---|---|---|
| | 3a | 3b | 3c | 3d | 3e | |
| Condition A | 1.74 | 1.88 | 1.81 | 1.93 | 1.91 | 2.35 |

TABLE 3

| | Example | | | | | | | | (Comparative Example 1) |
|---|---|---|---|---|---|---|---|---|---|
| | 1a | 1b | 1c | 1d | 2a | 2b | 2c | 2d | |
| Condition B | −0.18 | −0.28 | −0.27 | −0.33 | −0.13 | −0.18 | −0.27 | −2.62 | −0.11 |

TABLE 4

| Example | 2a | 2b | 2c | 2d | 4 | 5 | 6 |
|---|---|---|---|---|---|---|---|
| Condition A | 2.32 | 2.22 | 0.93 | −2.11 | −0.29 | −0.33 | −0.41 |

Condition A: temperature: 300° C.; time: 20 min
Condition B: temperature: 260° C.; time: 30 min A smaller chromaticity change value (Δb) indicates better anti-yellowing effect. It can be seen from the experimental data shown in Tables 2 and 3 that, compared with Comparative Example 1 (in which an anti-yellowing agent is not added), in the compositions of Examples 1a to 1d, Examples 2a to 2d, and Examples 3a to 3e of the present invention, sodium hypophosphite, hypophosphorous acid and phosphate were added as the anti-yellowing agents.

Under the conditions at high curing temperatures of 300° C. and 260° C., the compositions all exhibited better anti-yellowing performance.

Results of Examples 2a to 2d and Examples 4 to 6 are reported in Table 4. It can be known from the data in Table 4 that, compared with Example 2a (in which an anti-yellowing aid is not added), a synergistic effect is generated by using an anti-yellowing agent with an anti-yellowing aid (Examples 4 to 6), so that the composition of Examples 4 to 6 has a more significant anti-yellowing effect. In addition, by comparison of the results of Examples 4 and 2b to 2c, it can be seen that, because an anti-yellowing aid was added in Example 4, the composition of Example 4 (a relatively small amount of the anti-yellowing agent is used) provides an anti-yellowing effect equivalent to or better than that of the compositions containing a relatively large quantity of the anti-yellowing agent. By comparison of the results of Examples 4 and 5, it can be seen that when the anti-yellowing aid comprises a combination of different species, it has a better yellowing inhibition effect.

Deformation Test

Optical material compositions of Example 1a, Example 7 and Comparative Example 2 were prepared according to the proportions (grams) disclosed in Table 5. The composition was stirred and mixed evenly, and then injected into a PTFE vessel-shaped die (10 cm×10 cm×0.1 cm). The resin sheet was subjected to 1,800 mJ/cm$^2$ UV exposure (high-pressure mercury lamp), for curing, and formed into a sample with a size of 10 cm square and a thickness of 0.1 cm. The sample was subsequently removed to observe the appearance. The determination criteria were as follows:

O: Observe whether the sample is flat and four edges thereof are complete.

X: Observe whether the sample has distortion or warpage or whether the edges of the sample (film) is eroded.

TABLE 5

| | Component | | | | | |
|---|---|---|---|---|---|---|
| Example | a | b | c | d | i | Observation results |
| 1a | 35 | 15 | 0.2 | 0.05 | | O |
| Comparative Example 2 | | | 0.2 | 0.05 | 50 | X |
| 7 | 5 | | 0.2 | 0.05 | 45 | O |

From the results of Example 1a, Example 7 and Comparative Example 2 shown in Table 5, it can be known that if only a mono-functional acrylate-based monomer is used (Comparative Example 2), the film has poor flatness; and adding a proper amount of multi-functional acrylate-based monomer (Example 1a and Example 7) can improve the flatness of the film. In addition, by observing the appearance of the samples in Example 1a, Example 7 and Compara- Example 2, it can be known that the optical material composition of the present invention has good light transmittance.

What is claimed is:

1. An optical material composition, comprising the following components:
    (a) an acrylate-based material;
    (b) an anti-yellowing agent, selected from the group consisting of phosphoric acid, phosphate salt, phosphorous acid, hypophosphorous acid, hypophosphite salt, and a combination thereof; and
    (c) an initiator,
    wherein the amount of component (a) is about 70% to about 99.9% of the total weight of the composition, the acrylate-based material comprises an acrylate-based monomer, and the acrylate-based monomer comprises at least about 5% by weight of a multi-functional acrylate-based monomer.

2. The optical material composition according to claim 1, wherein the acrylate-based material further comprises an acrylate-based oligomer.

3. The optical material composition according to claim 1, wherein the amount of component (b) is about 0.01% to about 6% of the total weight of the composition; and the amount of component (c) is about 0.01% to about 10% of the total weight of the composition.

4. The optical material composition according to claim 1, further comprising (d) an anti-yellowing aid, selected from the group consisting of a thiol compound, a phenol compound, and a combination thereof.

5. The optical material composition according to claim 4, wherein the amount of component (d) is about 0% to about 8% of the total weight of the composition.

6. The optical material composition according to claim 1, wherein the composition is applied to a manufacturing process for a wafer level camera.

7. A wafer level camera lens, formed by the optical material composition according to claim 1.

* * * * *